US012017808B2

(12) United States Patent
Freestone et al.

(10) Patent No.: US 12,017,808 B2
(45) Date of Patent: Jun. 25, 2024

(54) DISPENSERLESS MULTI-SATELLITE LAUNCH CONFIGURATION WITH SIMPLE ADAPTER INTERFACE

(71) Applicant: Maxar Space LLC, Palo Alto, CA (US)

(72) Inventors: Michael Freestone, Woodside, CA (US); Joel Boccio, Palo Alto, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 17/554,000

(22) Filed: Dec. 17, 2021

(65) Prior Publication Data
US 2023/0192325 A1    Jun. 22, 2023

(51) Int. Cl.
*B64G 1/64* (2006.01)
*B64G 1/00* (2006.01)
*B64G 1/10* (2006.01)
*B64G 1/66* (2006.01)

(52) U.S. Cl.
CPC ............ *B64G 1/641* (2013.01); *B64G 1/002* (2013.01); *B64G 1/10* (2013.01); *B64G 1/66* (2013.01)

(58) Field of Classification Search
CPC ........ H01Q 1/08; H01Q 1/1235; B64G 1/222; B64G 1/44; B64G 1/643
See application file for complete search history.

(56) References Cited

U.S. PATENT DOCUMENTS

| 5,411,226 A * | 5/1995 | Jones .................... B64G 1/641 244/173.3 |
| 5,613,653 A * | 3/1997 | Bombled .............. B64G 1/641 244/173.1 |
| 8,915,472 B2 | 12/2014 | Aston et al. |
| 9,669,948 B2 | 6/2017 | Vichnin et al. |
| 10,053,240 B1 * | 8/2018 | Helmer ............... B64G 1/1007 |
| 10,654,594 B2 | 5/2020 | Arulf et al. |
| 11,286,062 B1 * | 3/2022 | Freestone ............... B64G 1/10 |
| 2012/0325973 A1 * | 12/2012 | Vezain .................... B64G 1/66 244/172.6 |
| 2014/0131521 A1 * | 5/2014 | Apland .................. B64G 1/641 244/173.3 |
| 2014/0319283 A1 * | 10/2014 | Holemans ............. B64G 1/641 244/173.3 |
| 2018/0170586 A1 * | 6/2018 | Riskas ..................... B64G 1/10 |
| 2018/0327119 A1 | 11/2018 | Arulf et al. |

(Continued)

*Primary Examiner* — Richard Green
*Assistant Examiner* — Nevena Aleksic
(74) *Attorney, Agent, or Firm* — Vierra Magen Marcus LLP

(57) ABSTRACT

Technology is disclosed for a dispenserless multi-satellite launch configuration in which multiple satellites are interconnected to form a composite beam structure that provides stability independently of the launch vehicle. When in the launch configuration, the satellites are formed into a bundle, where each satellite connects by one or more simple connector along the edges of its inner facing vertical side to the satellite adjacent on each side. This composite beam structure provides a stable launch configuration independently of the launch vehicle. Each of the satellites also has one or more connectors along the bottom edge of the inner facing vertical side allowing the bundle to be attached to a ring type launch vehicle interface. Once launched, the satellites can be dispensed by releasing the connector.

19 Claims, 17 Drawing Sheets

(56) References Cited

U.S. PATENT DOCUMENTS

| | | | |
|---|---|---|---|
| 2020/0011391 A1* | 1/2020 | Allen | F16F 1/027 |
| 2020/0198812 A1 | 6/2020 | Thenander et al. | |
| 2021/0053702 A1* | 2/2021 | Aston | B64G 1/641 |
| 2021/0107690 A1 | 4/2021 | Arulf et al. | |
| 2021/0221540 A1* | 7/2021 | Panetti | B64G 1/1085 |
| 2021/0229839 A1* | 7/2021 | Texier | B64G 1/002 |
| 2022/0194635 A1* | 6/2022 | Aston | B64G 1/641 |

* cited by examiner

DISPENSERLESS MULTI-SATELLITE LAUNCH CONFIGURATION WITH SIMPLE ADAPTER INTERFACE

BACKGROUND

The cost to launch spacecrafts such as satellites into orbit is extraordinarily expensive. The cost per satellite can be reduced by launching multiple satellites with one launch vehicle. Any additional mass adds considerably to the fuel cost. Thus, it is desirable to reduce the mass of the payload of the launch vehicle.

A satellite launch restraint and dispensing structure may be used to facilitate the launching of multiple satellites. The satellite launch restraint and dispensing structure typically connects to the launch vehicle. Once in orbit, the satellites may be dispensed from the restraint and dispensing structure. The satellites are sometimes oriented during launch one above another with respect to the gravitational force of the earth. Hence, the weight of the upper satellites needs to be supported either by satellites below and/or by the satellite launch restraint and dispensing structure. Because the satellite weight is equal to the mass times the gravitational acceleration, during launch the acceleration of the launch vehicle results a very high weight of the satellites.

However, the satellite launch restraint and dispensing structure must have adequate structural rigidity to support the satellites during launch. Also, during launch there are typically strong vibrations. Thus, it is challenging to design a satellite launch restraint and dispensing structure that has adequate structural rigidity and is low in mass.

Moreover, the satellite launch restraint and dispensing structure needs to be able to dispense the satellites once the launch vehicle is in orbit. Some conventional dispensing mechanisms are complex and add to the mass of the structure.

DETAILED DESCRIPTION

Technology is disclosed herein for supporting spacecrafts during launch and dispensing the spacecrafts into orbit. Traditionally, when launching multiple satellites or other spacecraft in a shared launch vehicle, each of the satellites are independently attached to a dispenser structure of the launch vehicle. The dispenser includes a payload attachment fitting onto where each of the spacecraft independently attach on their bottom side (as oriented in the launch configuration) and often to a center post of launch vehicle interface. Although this dispenser structure can provide stability for the spacecraft during launch and provide a mechanism for dispensing the satellites once launched, it adds mass to the combination of launch vehicle and payload and also has a number of parts that need to function correctly. The following presents a dispenserless multi-satellite launch configuration with simple adapter interface that results in lower mass, reduced parts count, and more complete use of fairing volume for payload.

In the dispenserless multi-satellite launch configuration embodiments presented here, multiple satellites are interconnected to form a composite beam structure that provides stability independently of the launch vehicle. When in the launch configuration, the satellites are formed into a bundle, where each satellite connects by one or more simple connector along the edges of its inner facing vertical side to the satellite adjacent on each side. This composite beam structure provides a stable launch configuration independently of the launch vehicle. Each of the satellites also has one or more connectors along the bottom edge of the inner facing vertical side allowing the bundle to be attached to a ring type launch vehicle interface. Once launched, the satellites can be dispensed by releasing the connector.

Figure 1:
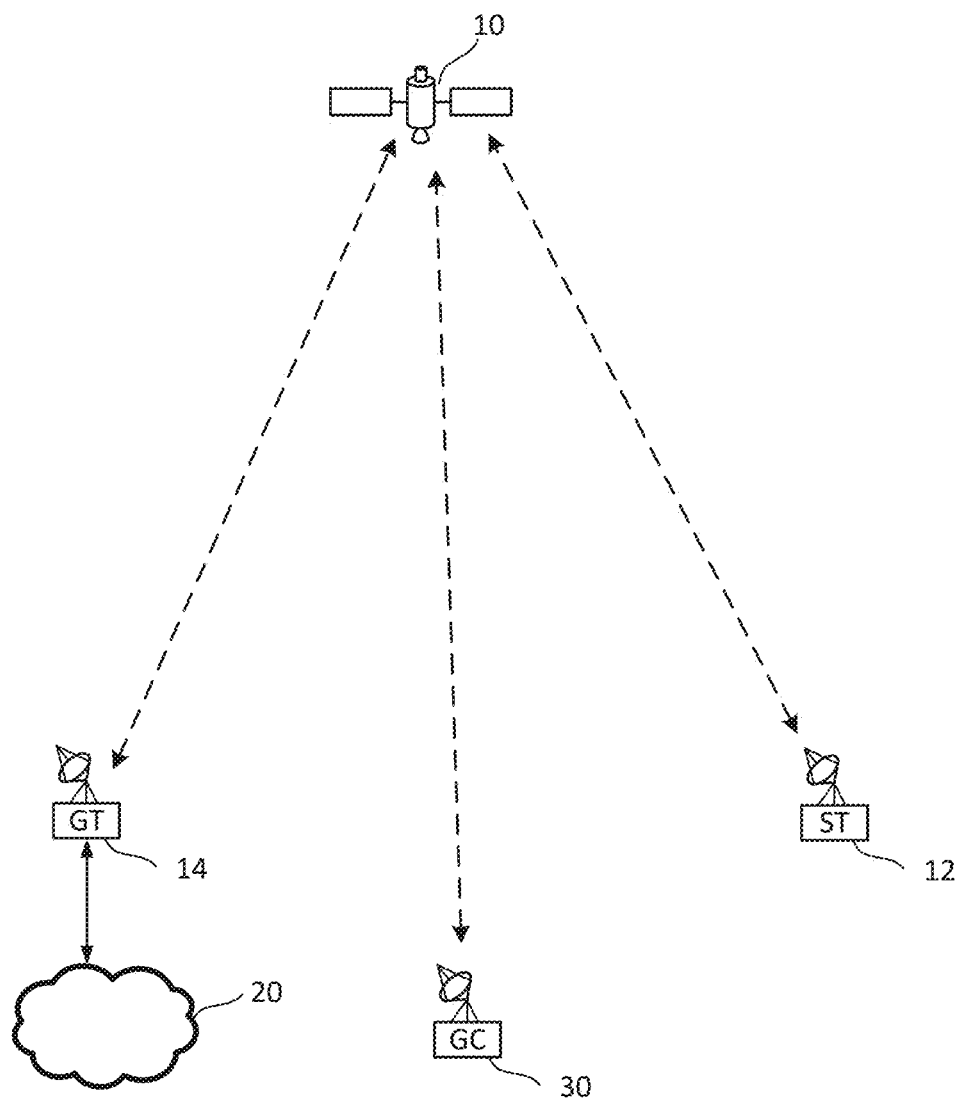
FIG. 1 is a block diagram of a spacecraft system.

FIG. 1 is a block diagram of a spacecraft system. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Technology disclosed herein may be used for launching and dispensing the spacecraft 10 into orbit.

Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 10 to provide internet connectivity to a plurality of subscriber terminals (e.g., subscriber terminal 12) via gateway 14. Ground control terminal 30 is used to monitor and control operations of spacecraft 10. Spacecraft can vary greatly in size, structure, usage, and power requirements, but when reference is made to a specific embodiment for the spacecraft 10, the example of a communication satellite will often be used in the following, although the techniques are more widely applicable, including other or additional payloads such as for an optical satellite.

Figure 2:
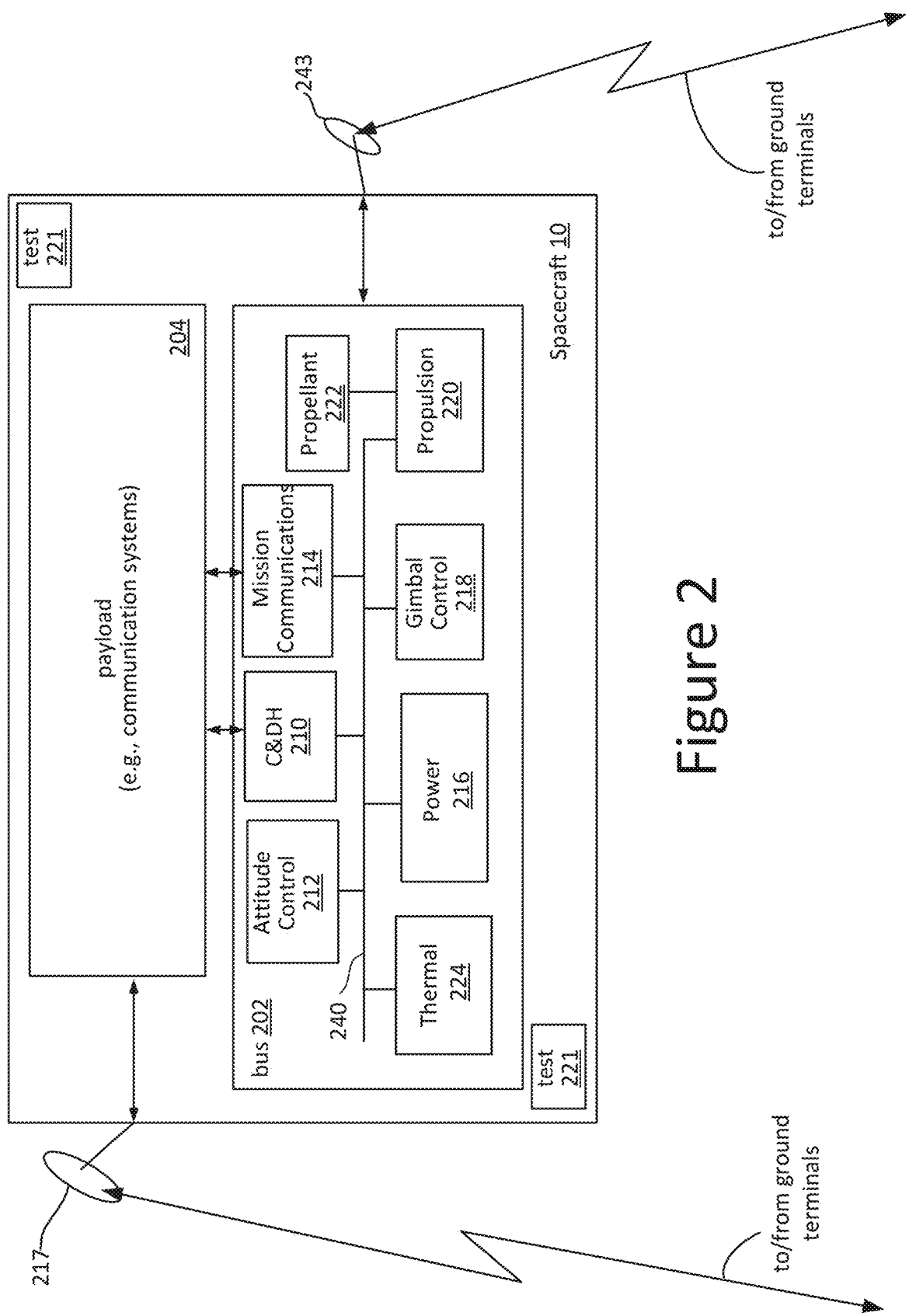
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218 that be taken to include a solar array drive assembly, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communication systems 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 include wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 3:
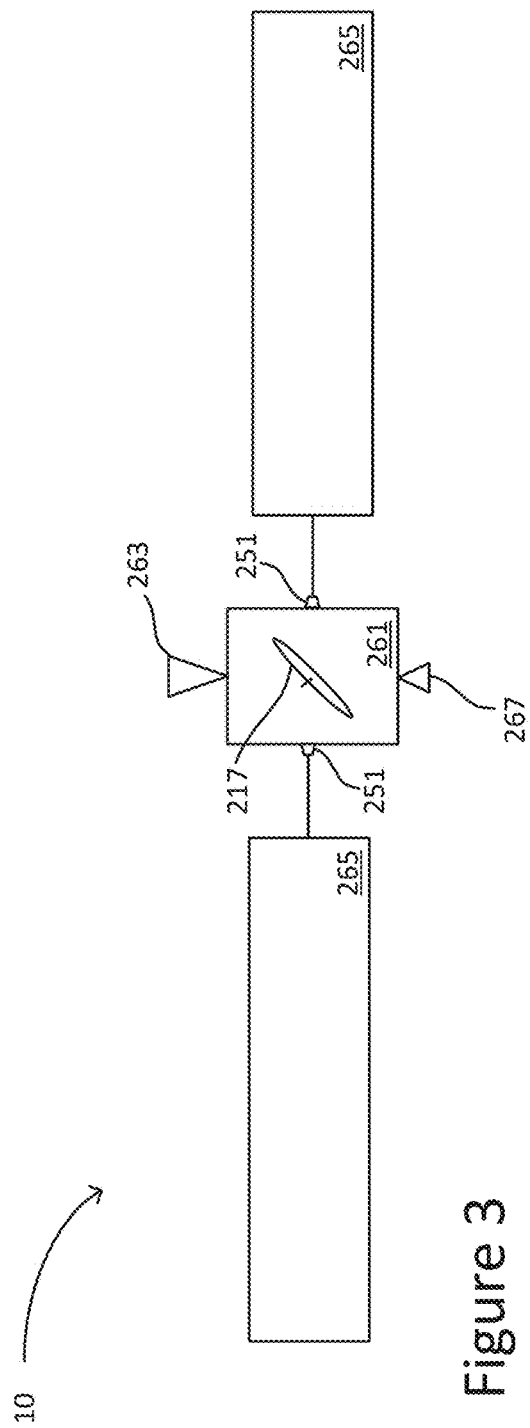
FIGS. 3 and 4 present an exterior view for an embodiment of a deployed spacecraft in more detail.
Figure 4:
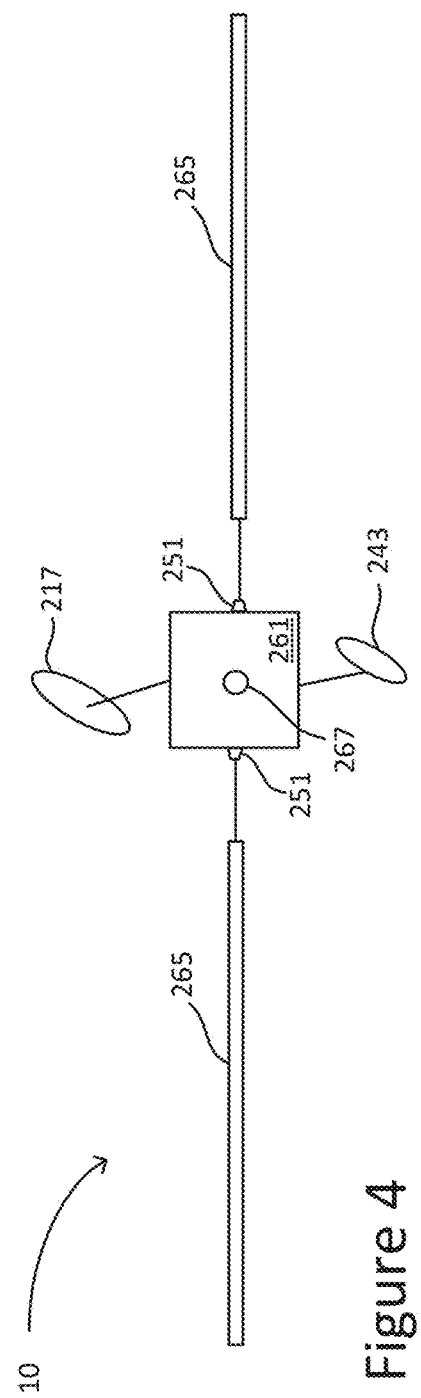

FIGS. 3 and 4 look an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the spacecraft body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control or solar array drive assembly 251 about the longitudinal axis (the left-right axis in FIGS. 3 and 4), in order to achieve or maintain a desired attitude with respect to, for example, the sun. For embodiments in which the deployed arrays 265 include a solar array, the solar array may be articulable so as to be substantially sun facing and electrically connected to the spacecraft 10 to provide power. The deployed solar array 265 may be sized and positioned so as to generate substantially more power from sunlight than would be possible if the solar array was fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing. For shipping and launching of the spacecraft 10, the solar array is stowed into a small volume. Although the stowed volume is wanted to be as small as practicable, the solar array will also need to be large enough to provide sufficient power for spacecraft operations once deployed.

To launch a satellite or other spacecraft, it is put into its stowed configuration and mounted onto a launch vehicle. Depending on the size of the spacecraft and the size of the launch vehicle, the spacecraft may be launched singly or, more commonly, in groups, where having multiple spacecraft share a launch vehicle can reduce the launch cost per satellite. When launching multiple spacecraft on a shared launch vehicle, the spacecraft may be stacked in one or more layers with each of the layers having one or more spacecraft arranged radially about the launch vehicle's central axis in a spacecraft launch restraint and dispensing structure in which the spacecraft are attached a central post and held in place by a tie-down mechanism. In this instance, the spacecraft are more or less considered "dead mass" which the dispenser much support.

Figure 5A:
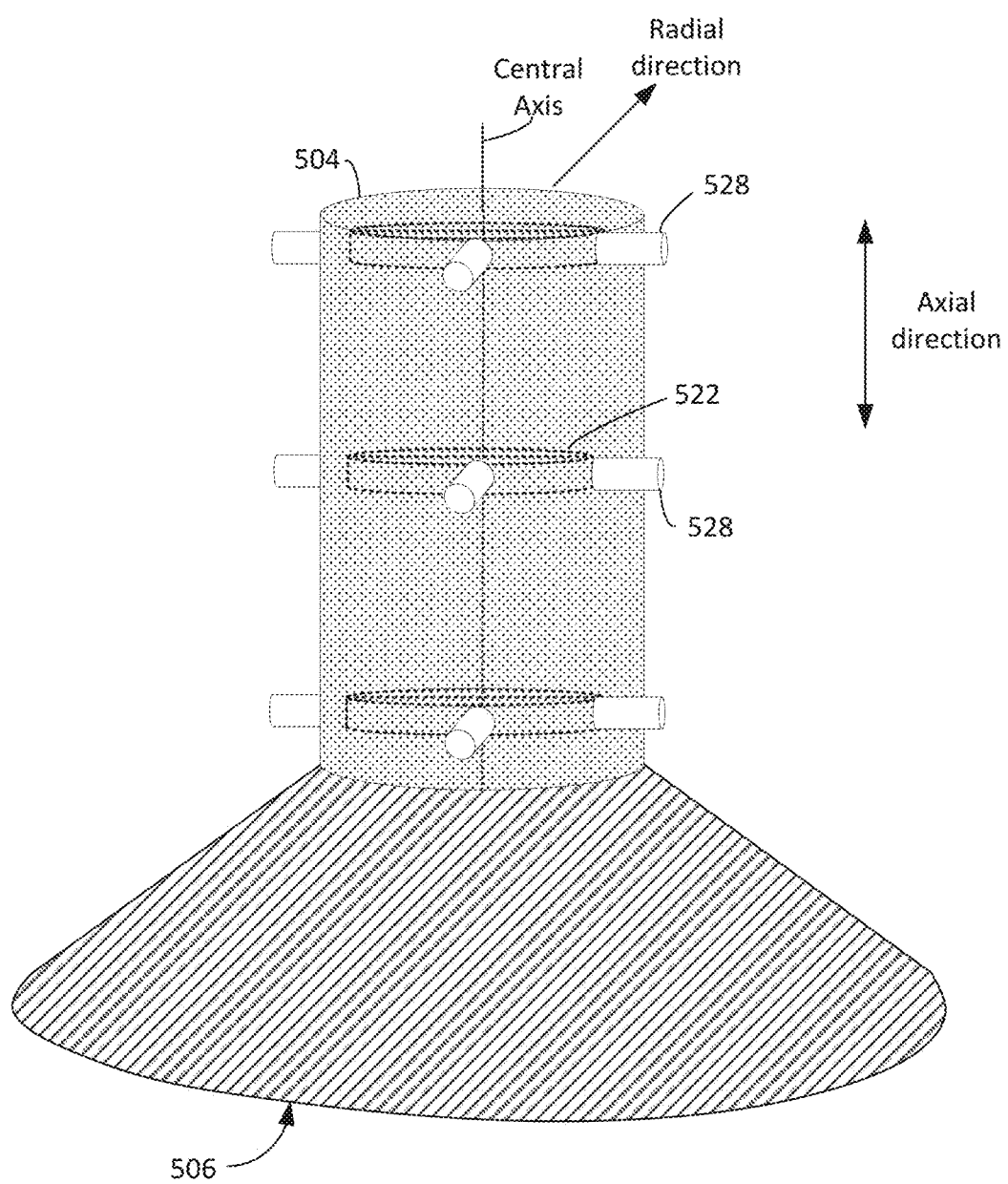
FIGS. 5A-5C illustrate some features of embodiments for spacecraft launch restraint and dispensing structure in which the spacecraft are attached a central post.
Figure 5B:
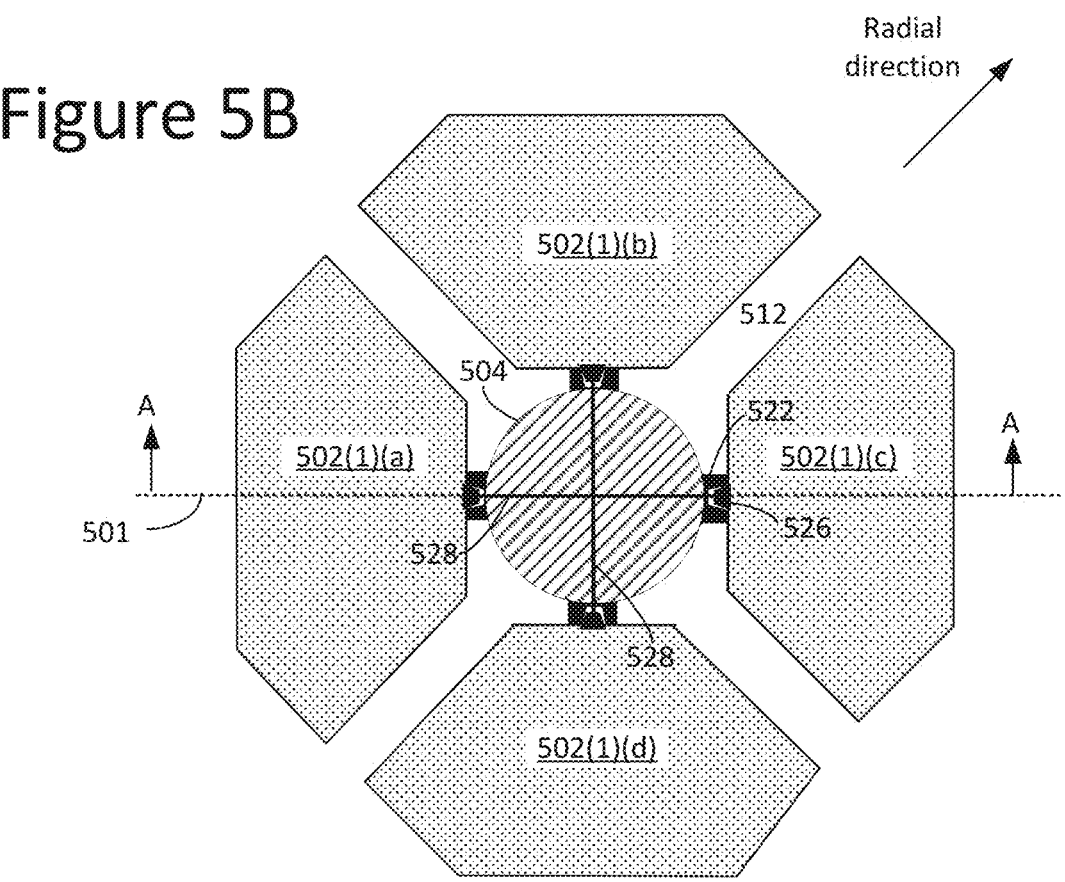
Figure 5C:
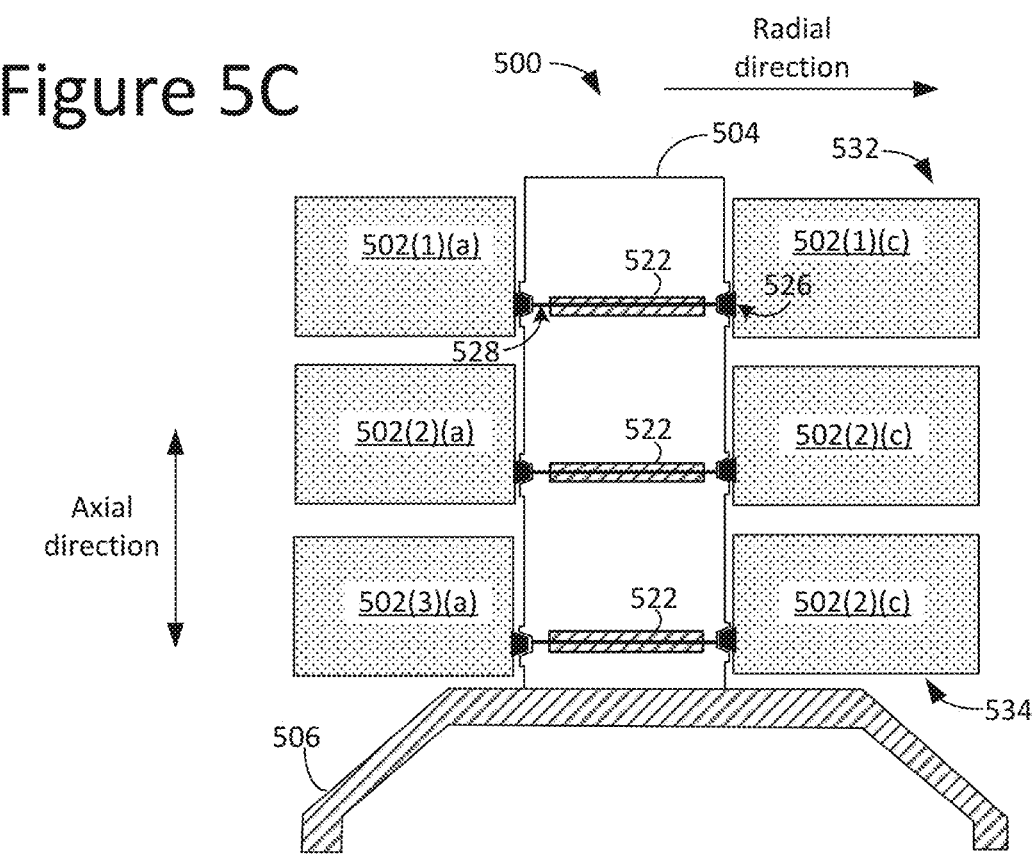

FIGS. 5A-5C illustrate some features of embodiments for spacecraft launch restraint and dispensing structure in which the spacecraft are attached a central post. FIG. 5A is a diagram of one embodiment of a spacecraft launch restraint and dispensing structure 500. For brevity, the spacecraft launch restraint and dispensing structure 500 may be referred to herein as a dispensing structure 500. The dispensing structure 500 may be used to provide structural support to stacks of spacecrafts and to dispense the spacecrafts into orbit. The spacecrafts are not depicted in FIG. 5A. In an embodiment, the spacecrafts are satellites.

The dispensing structure 500 has a number of primary tie-down mechanisms. The launch adaptor 506 is configured to be connected to a launch vehicle, such as a rocket. In general, the launch adaptor 506 is used to help carry the load from the dispensing structure 500 to the launch vehicle. The launch adaptor 506 may be formed from a material such as aluminum, titanium, or graphite. In the example of FIG. 5A, the launch adaptor 506 has a cone to which a central post 504 and the primary tie-down rods are attached. The launch adaptor 506 may have a wide variety of shapes. Therefore, the shape of the launch adaptor 506 in FIG. 5A is an example to which the launch adaptor 506 is not limited.

In the embodiment of FIG. 5A, the dispensing structure 500 has a central post 504, which is connected to the launch adaptor 506. The central post 504 is aligned with a central axis. Attached to the central post 504 are a number of tie-down mechanisms. Each tie-down mechanism includes one or more tie-down release mechanisms 522, and a number of tie-down rods 528. The tie-down rods 528 are used to hold the satellites around the central axis. FIG. 5A depicts nine tie-down rods 528, each of which can be used to hold a spacecraft. There may be additional tie-down rods 528 on the back side of the central post 504; however, those tie-down rods are not depicted in FIG. 5A. Thus, the dispensing structure 500 depicted in FIG. 5A may be used to hold 12 satellites.

A number of tie-down release mechanisms 522 are depicted in FIG. 5A. The tie-down release mechanisms (or actuators) 522 are used to release (or dispense) the satellites in the radial direction. In an embodiment, each tie-down release mechanism 522 is an electro-mechanical device that may be commanded by a signal from, for example, a micro-processor. In an embodiment, the tie-down release mechanism 522 is a low-shock release mechanism, such that the release does not damage electronics in the satellites 502. In some embodiments, a single tie-down release mechanism 522 may be used to release two spacecrafts simultaneously.

The dispensing structure 500 may be used for more or fewer than three levels of spacecrafts, in which case there would be more or fewer than three levels of tie-down release mechanisms 522, as well as more or fewer than three levels of tie-down rods 528. The dispensing structure 500 may be used for more or fewer than four satellites at each level, in which case there would be more or fewer than four primary tie-down rods. Also, there may be more or fewer than four tie-down rods 528 at each level.

In an embodiment, the central post 504 is a structural element that provides structural support for the satellites. Herein the term "structural post" or the like used in connection with the central post means that the central post 504 bears a load from the satellites 502. In other words, a structural central post will carry much of the weight of the satellites 502. Example materials for the central post 504 include, but are not limited to, aluminum, titanium and graphite. In some embodiments, there is a non-structural element aligned with the central axis, as an alternative to the structural central post 504. The non-structural element may allow attachments of elements such as the tie-down release mechanisms 522. However, the non-structural element need not provide structural support for the satellites. In other words, a non-structural central element does not bear a load from the satellites 502.

FIG. 5B is a top view of an embodiment of the spacecraft launch restraint and dispensing structure 500. The top view of FIG. 5B shows four satellites 502(1)(a), 502(1)(b), 502(1)(c), and 502(1)(d) on the top level of stacks of satellites. A middle level and a lower level may also have four satellites. The reference numeral 502 will be used herein to refer to a satellite in general, without reference to a specific satellite. FIG. 5C is a cross-sectional diagram of one embodiment of the spacecraft launch restraint and dispensing structure 500, and is consistent with the structure depicted in FIG. 5B. FIG. 5C shows a view from along line 501 in FIG. 5B, looking in the direction of arrows labeled A. FIG. 5C shows two stacks of satellites, each having three satellites 502. Specifically, FIG. 5C shows a first stack having satellites 502(1)(a), 502(2)(a), and 502(3)(a). FIG. 5C shows a second stack having satellites 502(1)(c), 502(2)(c), and 502(3)(c). The configuration depicted in FIGS. 5B and 5C has four stacks of satellites; however, the two other stacks of satellites are not depicted in FIG. 5C.

The dispensing structure 500 allows for a stacked configuration of satellites. A stacked configuration of satellites means that one satellite is stacked above another, although the bodies of the satellites do not necessarily touch one another. In general, there are two or more satellites 502 per level. Thus, in general, there are two or more stacks of satellites.

The central post 504 connects to the launch adaptor 506. The satellites 502 are held to the central post 504 by tie-down rods 528. FIG. 5B depicts two tie-down rods 528 at the top level. The middle and lower levels may also each have two tie-down rods 528. The tie-down rods 528 will hold the satellites 502 after the primary tie-down rods are configured into the ejection position when the satellites are ready to be dispensed. In an embodiment, a tie-down rod 528 is bolted to a satellite 502.

A tie-down release mechanism 522 controls the ejection of satellites 502 in the radial direction. The tie-down release mechanism 122 may be an electromechanical device. In an embodiment, electrical signals are sent to the tie-down release mechanisms 522 to control the ejection of the satellites 502

The central post 504 may be formed from, for example, aluminum, titanium, or graphite. In general, the central post 504 may be formed from a light and strong material. In an embodiment, the central post 504 is hollow. Hence, the central post 504 could have the general shape of a hollow tube. However, the central post 504 could also have a truss structure.

As noted above, typically there are strong vibrations during launch. The dispensing structure 500 holds the spacecrafts together such that the satellites do not rock and do not separate from each other during launch vibrations.

Although the spacecraft launch restraint and dispensing structure 500 illustrated by FIGS. 5A-5C and similar structures are effective mechanisms for their intended restraining and dispensing functions, they both increased mass and part count to the combined launch vehicle and payload. Minimization of mass is off great importance in the design of spacecraft and their launch vehicle. Reduction of part count is also important, as this reduces the number of possible failure mechanism and increases reliability. Consequently, if a multi-satellite launch configuration were to eliminate the dispenser structure and simplifier the adaptor interface between the multiple spacecraft and the launch vehicle, this could be beneficial. The following discussion presents embodiments of such multi-satellite launch configurations.

More specifically, the following discussion presents launch vehicle configurations in which the spacecraft can be tied together with release devices to create a composite beam section to simplify the launch vehicle interface and allow a payload attach fitting to a circular pattern, thus eliminating the need for an adapter. This reduces the mass and cost of the launch vehicle and also the mass of the spacecraft to maximize payload mass fraction to orbit. This can be particularly effective as the enclosure, or fairing, size of launch vehicles increase, allowing for accommodation of larger spacecraft.

As launch vehicles increase their capacity to place spacecraft into orbit, including increases in fairing diameter, it will be possible to launch more spacecraft in a single launch. In addition, as fairings increase in diameter so will the payload attach fittings (PAFs). These larger launch vehicle interfaces enable easier adaptation of large spacecraft, such as a 1000 kg or more, to that adapter with a minimal interface. Further, the use of a truss-based primary structures for satellites makes the adaptation to large interfaces simpler, in particular for the embodiments presented below. By tying the spacecraft together in several points along their length, a composite section similar to an I-beam is formed. This composite section provides a high degree of stiffness and stability, such that each SC need only supply a few (e.g., 1 or more, but 2 in the embodiments below) attachments to the launch vehicle for a stable combination of spacecraft. In contrast, a single truss spacecraft would need a minimum of 3 points to form a stable base, and at that, would likely need 4 or more interfaces of larger diameter and greater strength as the bending moment of a single spacecraft resolved about a narrow footprint will result in higher interface forces than the composite beam structure. Although the following discussion will mainly be presented in the context of a single layer of larger spacecrafts using a truss-based primary structure, it can be applied more generally, including primary structures based panels, plates, or various combinations of these.

Figure 6B:
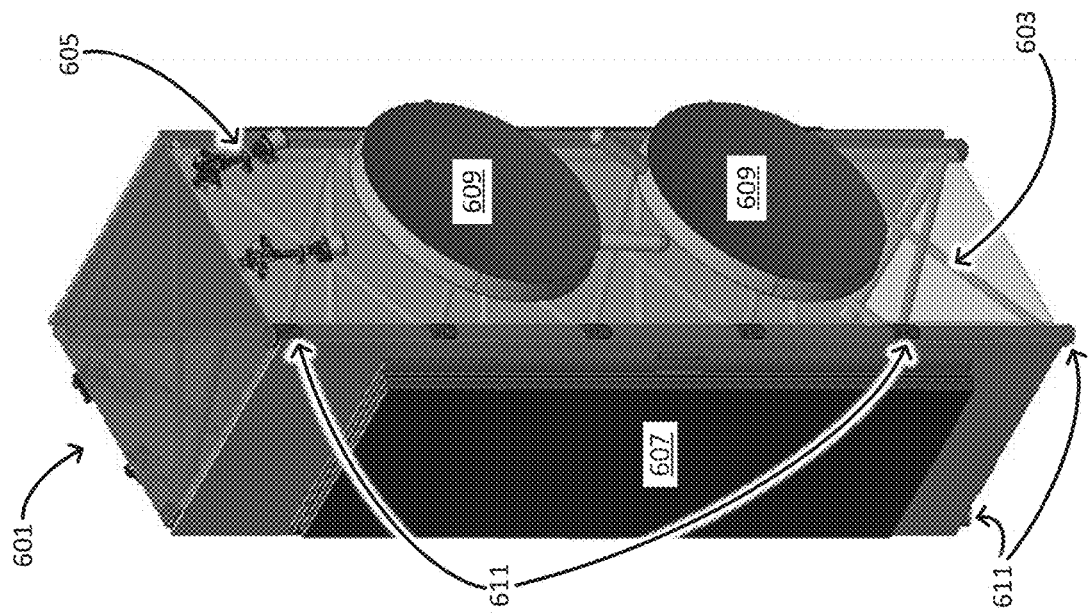
FIGS. 6A-6D illustrate an embodiment of a spacecraft that is used in the following examples of a dispenserless launch configuration.
Figure 6A:
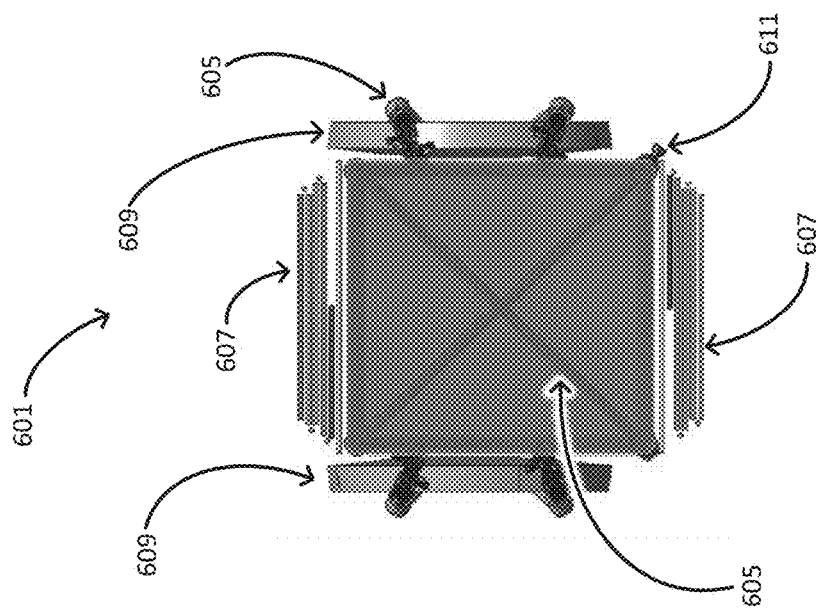
Figure 6D:
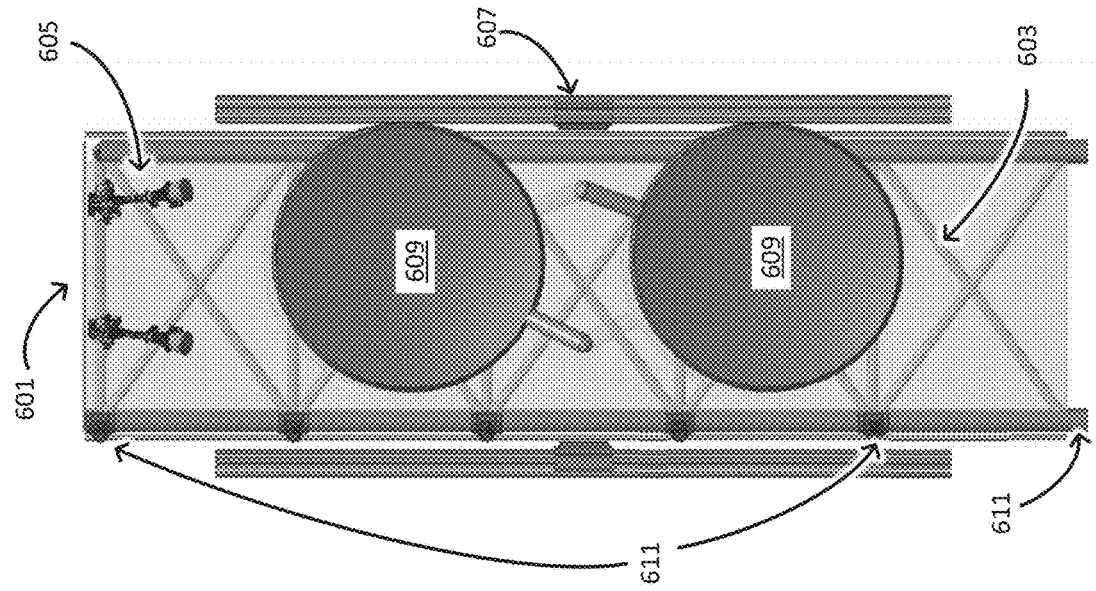
Figure 6C:
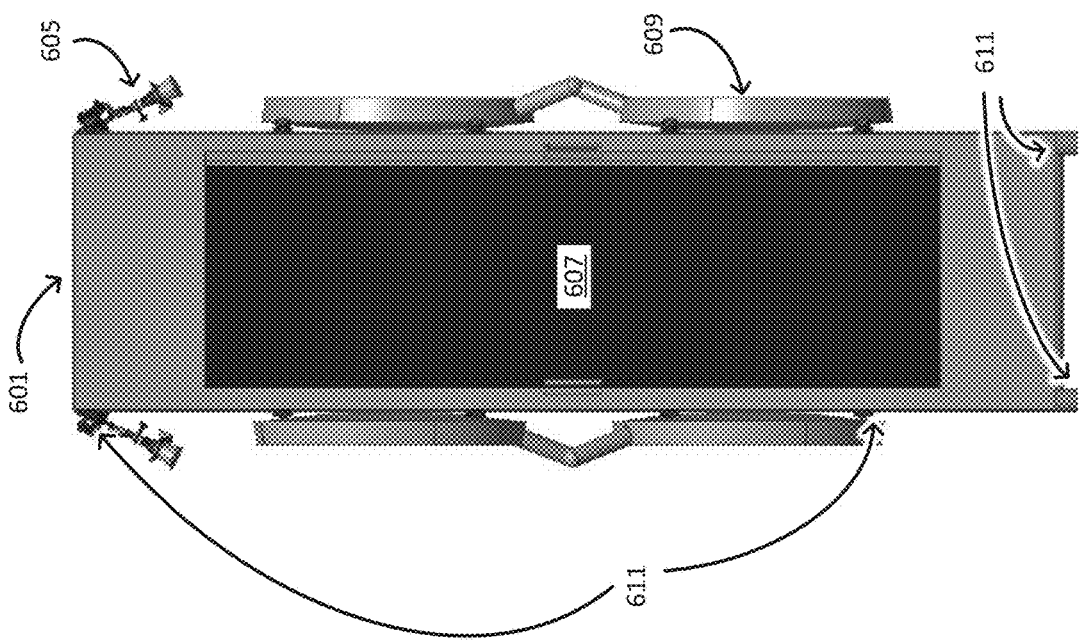

FIGS. 6A-6D illustrate an embodiment of a spacecraft that is used in the following examples of a dispenserless launch configuration. In FIGS. 6A-6D, the spacecraft 601 is in the stowed configuration it would have prior to being attached to the launch vehicle. FIG. 6A is a top view, FIG. 6B an oblique view, and FIGS. 6C and 6D are side view. In this example, the top and bottom of the spacecraft are square and the sides are elongated rectangles, but other form factors can be used. Mounted on one pair of opposing sides are a pair of solar arrays 607 in a stowed configuration that can be deployed by, for example, releasing tie-downs once the spacecraft is on-orbit. On the other pair of opposing sides are reflectors or antenna 609 in their stowed configuration that can be extended once the spacecraft deploys. RF feed horns 605, are located at corners of the satellite and are also folded in for stowing and can point towards reflectors when in the deployed configuration.

The embodiment of FIGS. 6A-6D uses a truss-based primary structure that, in this representation, is visible though the top and the sides with the reflectors or antenna 609, where one of the frame member struts 603 is numbered in the views of FIGS. 6A-6D. To simplify the drawings, the internal elements, such as those described above with respect to FIG. 2, are not shown in these and the following figures. The embodiments for dispenserless launch configurations presented here mount multiple such rectangular spacecrafts oriented longways vertically as a bundle arranged circularly around the central axis of the launch vehicle. For this purpose, each of the spacecrafts includes one or more connectors along an inner bottom edge to attach to the launch vehicle interface and one or more connectors along two vertical edges to attach to the neighboring spacecraft. In the embodiment of FIGS. 6A-6D, a first pair of connectors 611 are located at the bottom corners of one of the sides, with a pair of connectors 611 along both vertical edges of this side. More detail on the connectors is given below with respect to FIGS. 8A-8D. By mounting the group of spacecraft together into a bundle that is attached along the bottom to the launch vehicle, the composite structure can avoid the use of a central post (504) and other components of structure 500, reducing mass and the number of parts that could malfunction. Alternate embodiments could also include a central structure, if even greater rigidity were wanted, the examples presented here will lack this central post.

FIGS. 7A-7D illustrate one embodiment of a multi-satellite "composite beam" launch configuration for a five spacecraft example, using the spacecraft embodiment of FIGS. 6A-6D. Spacecraft, especially large ones where the length is significantly larger than the breadth, are most typically mounted to the launch vehicle in a cantilevered fashion. By connecting several spacecraft together, the overall stack stiffness can be dramatically increased through a higher area moment of inertia while the loads are reduced through resolving bending moments into force couples. With the spacecraft loads resolved as tension/compression force couples around the launch vehicle interface, a very simple adapter or adapter-less design may be implemented to reduce the cost, mass, and complexity of launching multiple spacecraft on one launch vehicle. This can enable a lower mass spacecraft and the ability to provide a higher payload mass fraction to orbit as the spacecraft and dispenser mass is reduced and higher volume fraction as less of the available fairing volume is used for a dispenser. Although FIGS. 7A-7D shows a five spacecraft example, the technique can be applied to two or more spacecraft, where a three satellite example shown in FIG. 9. In some embodiments, such as a two satellite, if additional rigidity is wanted the outside edges of the satellites could connect to the launch vehicle in addition to the insides connecting to each-other.

The satellites 601a, 601b, 601c, 601d, and 601e of FIGS. 7A-7D can be as described above with respect to FIGS. 6A-6D in this example, but, aside from some of the connectors 611, the components of the spacecraft are not numbered to simplify the drawings for discussion. In the oblique view of FIG. 7A, one pair of connectors 611 are labeled at the bottom corners of satellites 601a and 601b, where the satellite's connectors 611 attach to a launch vehicle interface 621 (not visible in FIG. 7A) that can be a clamp-band interface shared by the bundle of satellites. The outer, visible ring 623 represents the launch vehicle's fairing, within which the satellites will fit when in launch configuration. Along either side, each satellite is connected to its neighbor by two connectors 611, where the upper connectors 611 between satellites 601a and 601e and the lower connectors 611 between satellites 601a and 601b are labeled.

Figure 7A:
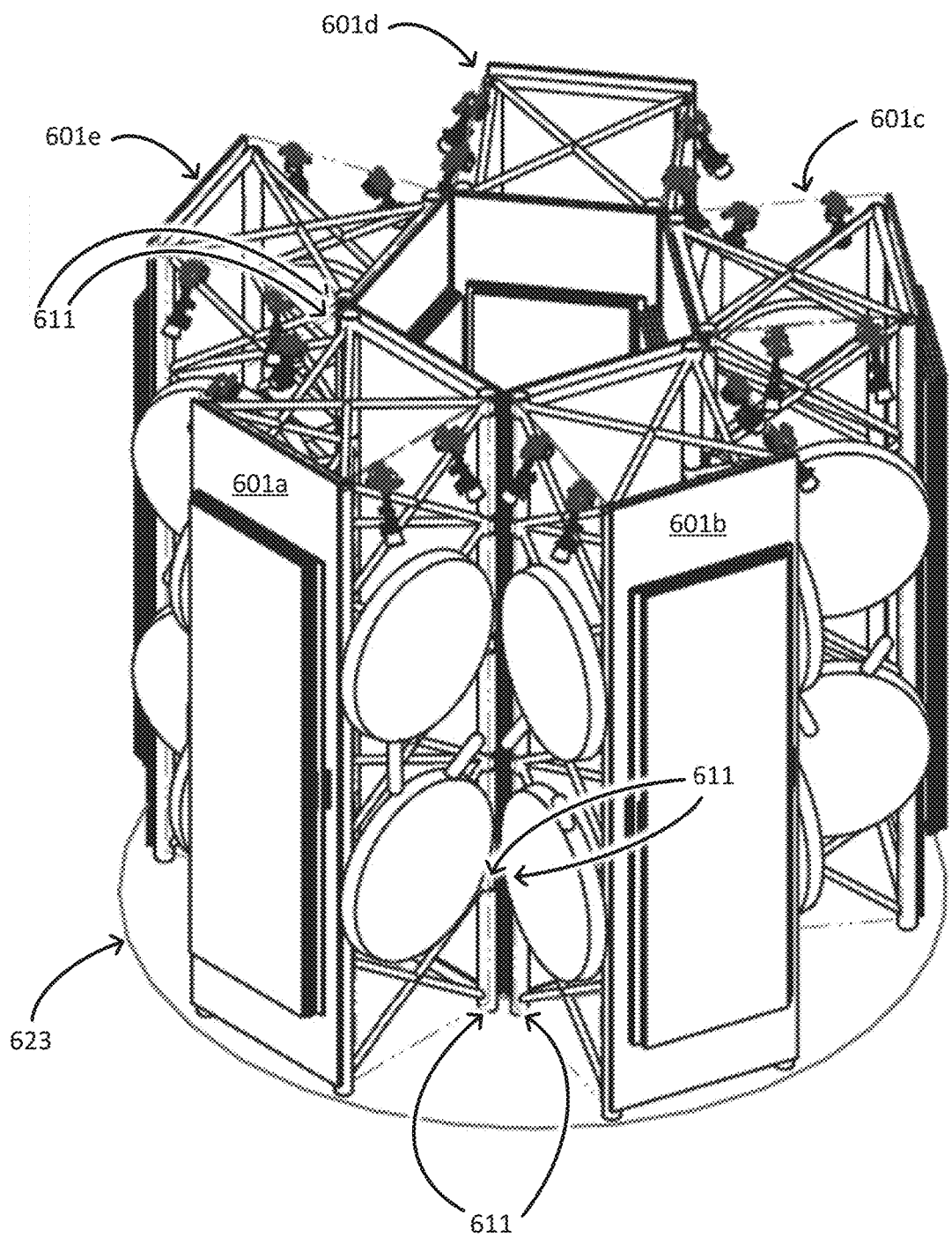
FIGS. 7A-7D illustrate one embodiment of a multi-satellite "composite beam" launch configurate for a five satellite example using the satellite embodiment of FIGS. 6A-6D.
Figure 7B:
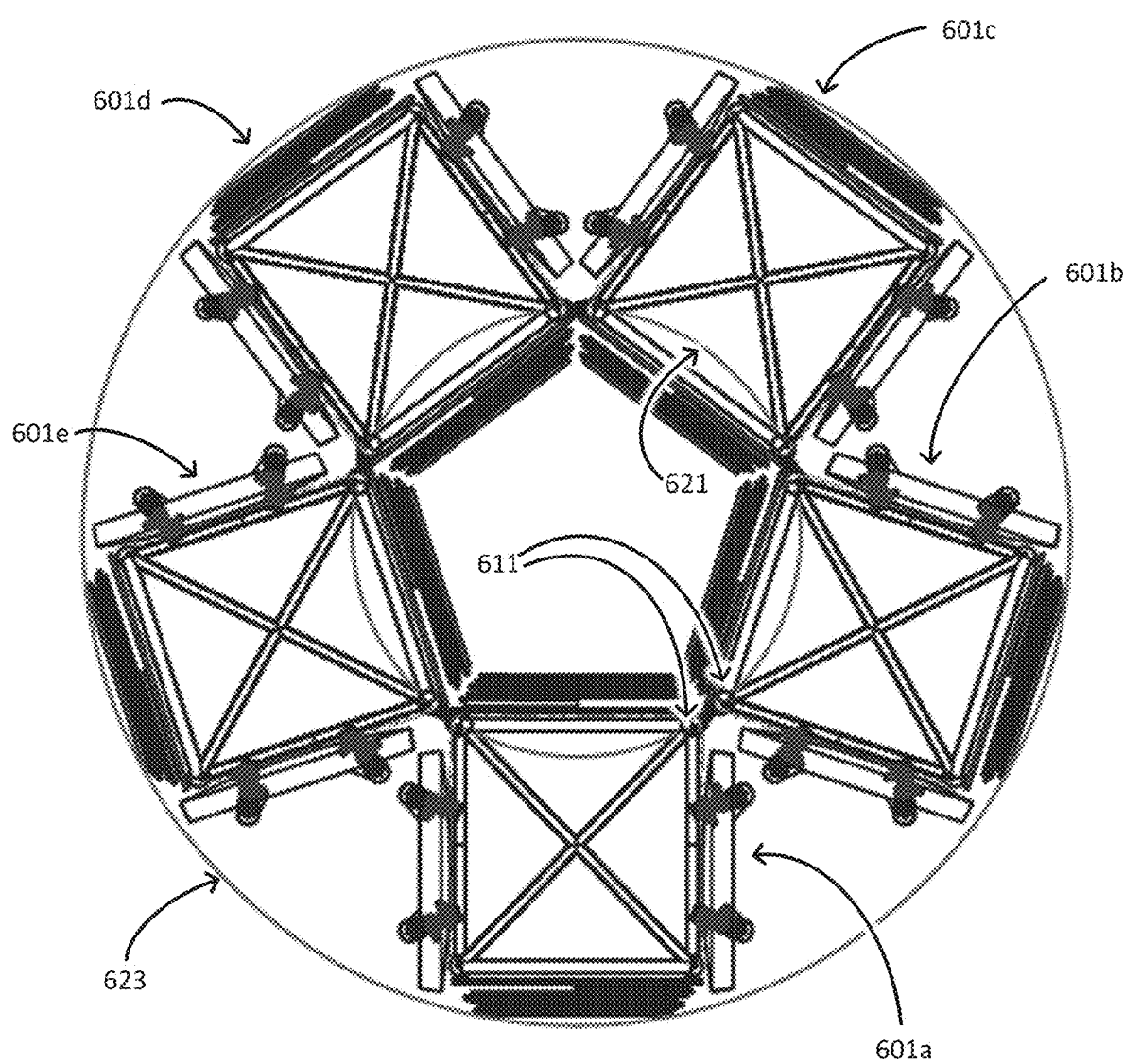
Figure 7C:
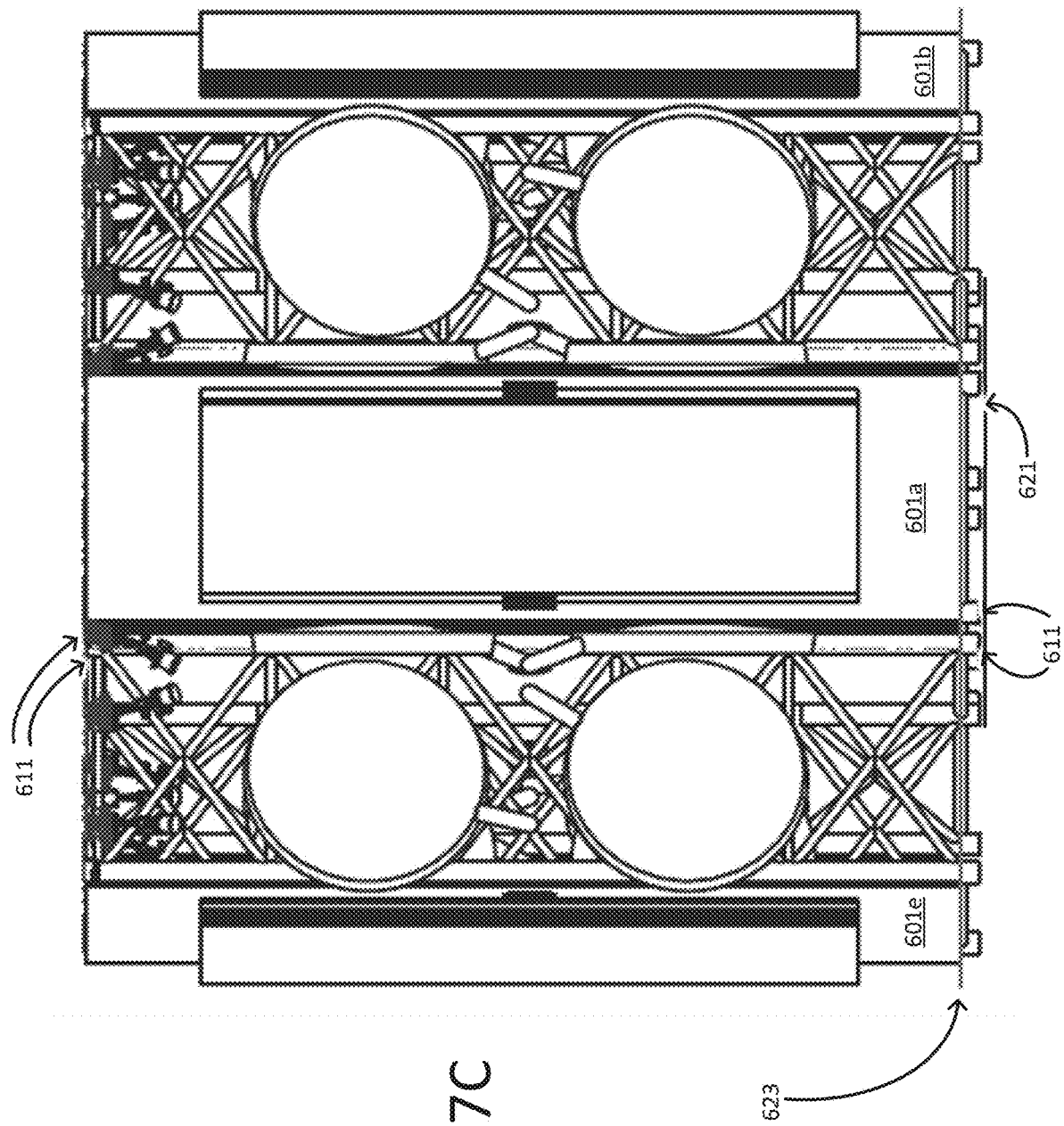
Figure 7D:
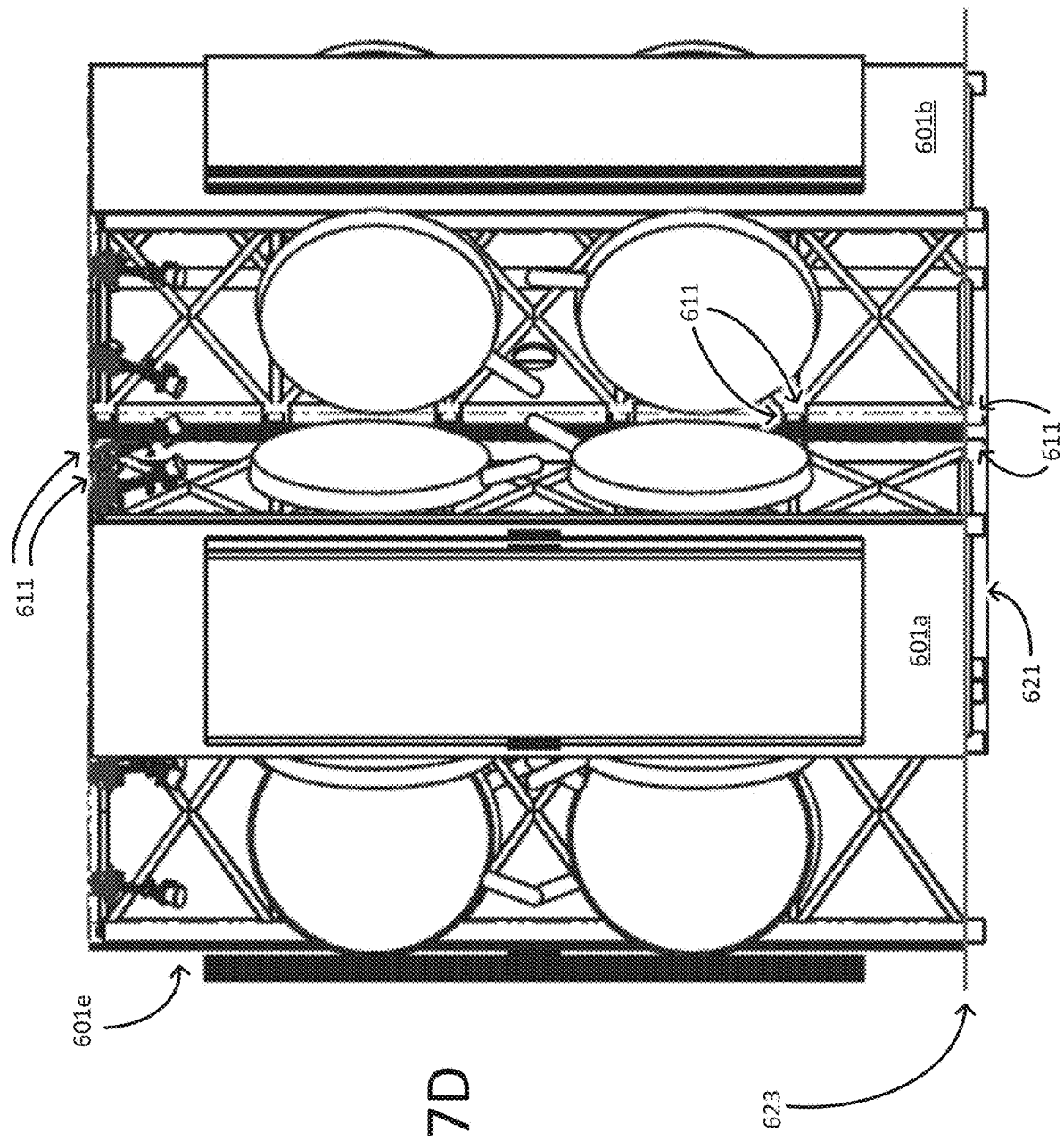
Figure 9:
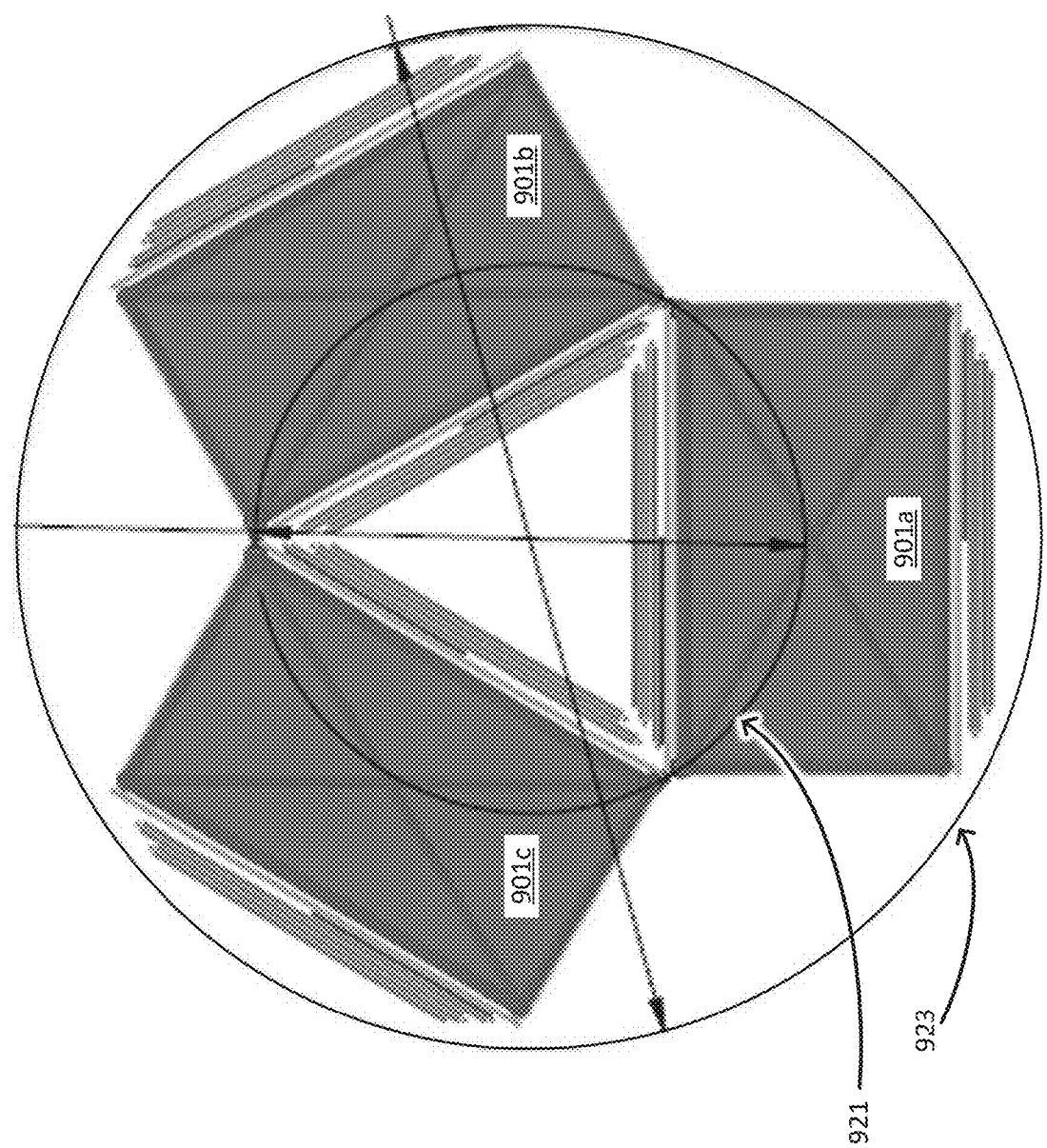
FIG. 9 presents a top view of an alternate embodiment to illustrate launch configuration for three satellites.

FIG. 7B is a top view of composite beam structure formed by the bundle of satellites 601a, 601b, 601c, 601d, and 601e. The outer ring of fairing 623 is shown and the launch vehicle interface 621 to which the satellites inner, bottom edges clamp is also shown. Only the upper connectors 611 between satellites 601a and 601b are labelled. As seen in the top view of FIG. 7B, as there is no center post, there is a cylindrical central region within the bundle of satellites. In this 5 satellite example, the region is pentagon, but, more generally, the region will be an N sided polygon for an N satellite bundle. (A triangular example is illustrated in FIG. 9.) This central region can be used for one or more additional satellites. The region above the bundle also provides a large diameter storage region, such as can be used for components of the satellites, as also illustrated below with respect to FIGS. 12A-12C. FIGS. 7C and 7D are side views that are rotated relative one another to further illustrate how the bundle of satellites are arranged. Although the embodiment of FIGS. 7A-7D illustrate only a single layer of satellites of a relatively tall aspect ratio, other embodiments could use multiple layers of spacecraft, where upper layers can use a similar connector structure with the layer below.

In a typical prior art arrangement, the individual satellites would have independent circular interfaces and thus require a dispenser/adapter between the payload attachment fittings and the spacecraft, with each satellite independent and self-stable. In addition, since satellites tend to be tall relative to their launch vehicle interface, each satellite is a thin beam in bending. The bundle arrangement illustrated with respect to FIGS. 7A-7D creates a composite beam section to increase the stiffness and stability while reducing loads going into the launch vehicle interface. The spacecraft's primary structure need not be a truss as depicted in the examples, although a truss-type structure can make this easier.

Figure 8A:
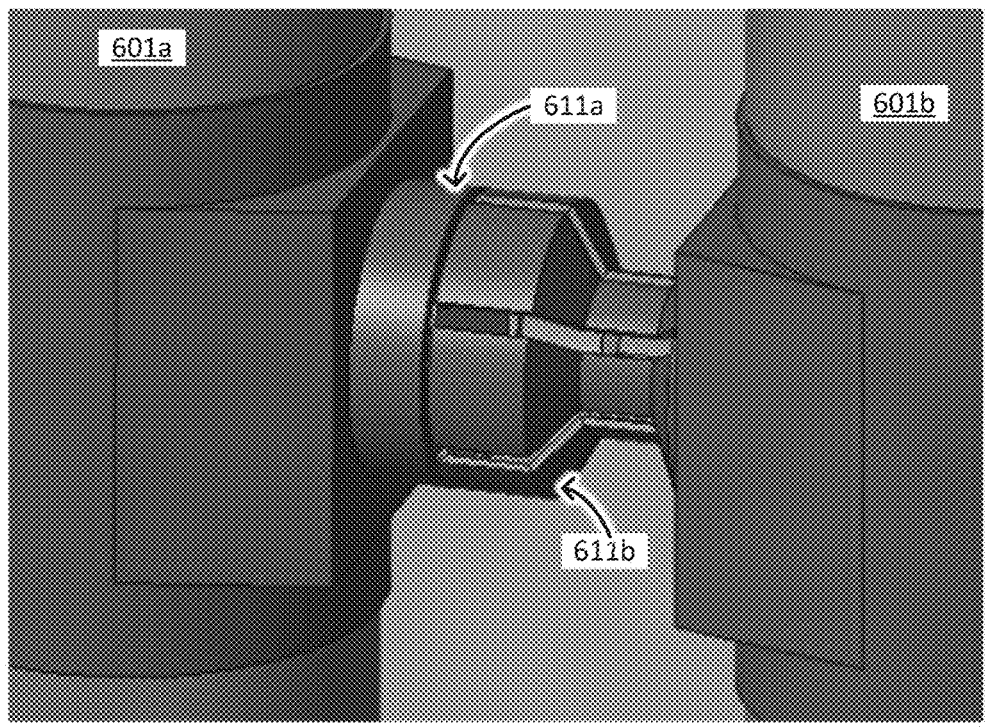
FIGS. 8A-8D illustrate an embodiment for the connectors in more detail.
Figure 8B:
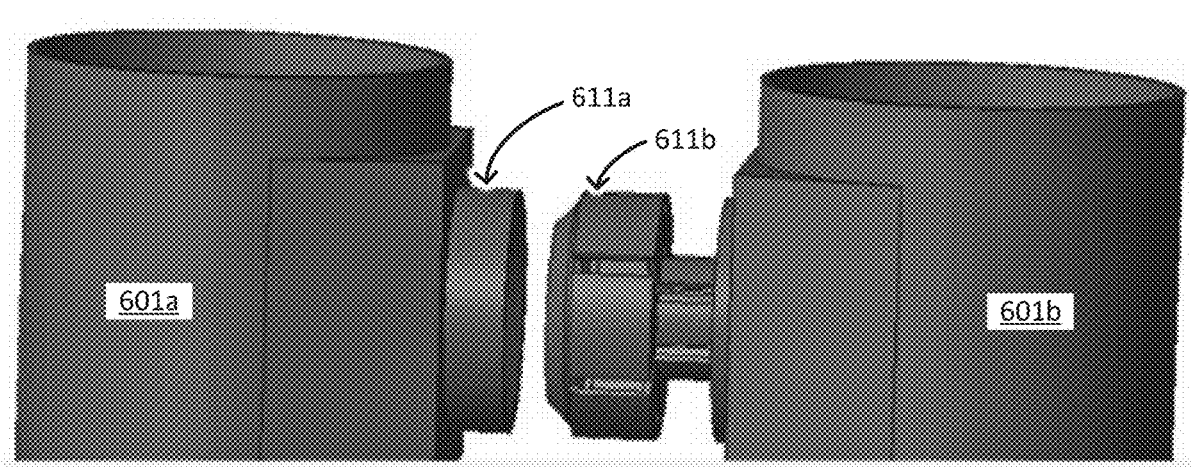

FIGS. 8A-8D illustrate an embodiment for the connectors in more detail for a flexure embodiment, although other releasable connectors can be used in alternate embodiment. These figures illustrate the connectors in the context of the connectors between a pair of adjacent spacecraft in the arrangement of FIGS. 7A-7D, but a similar connector structure can be used at the interface between the spacecraft and the launch vehicle. FIGS. 8A and 8B are respectively perspective drawings of the connector in a stowed configuration and a deployed configuration, with FIGS. 8C and 8D corresponding cross-sectional drawings. In this example embodiment, the release device connection uses a cup and cone connection where either the cup or the cone can be on a flexure such that in the stowed state the flexure is under strain energy. Once the connection is released, it returns to a zero-strain state in which the cup and cone are completely clear for deployment. Depending on the embodiment, the connectors can be built directly into the additively manufactured frame member nodes of each spacecraft or integrated into other structural forms such as panels.

FIG. 8A is a drawing of the stowed configuration where the flexure strained and nodes of adjacent satellite 601a and 601b are connected with a low-shock release device and cup 611b/cone 611a interface. In the FIG. 8B drawing of the deployed configuration, the flexure is in a stress-free state, with a gap between cup 611b and cone 611a for deployment clearance. Although FIGS. 8A and 8B illustrate the cup/cone connection between adjacent satellites in the launch configuration, a similar arrangement can be used between the spacecraft and the launch vehicle, with the cup 611b and cone 611a arranged either way around. The embodiment of FIGS. 7A-7D uses six points of connection for each of the satellites, two to either side and two at the spacecraft to launch vehicle interface, but other embodiments can use differing number along each of this satellite-to-satellite and satellite-to-launch interfaces.

Figure 8C:
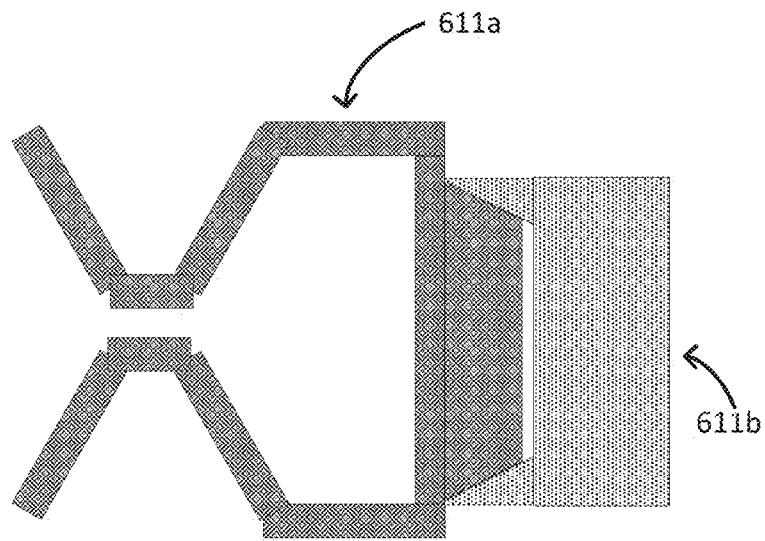
Figure 8D:
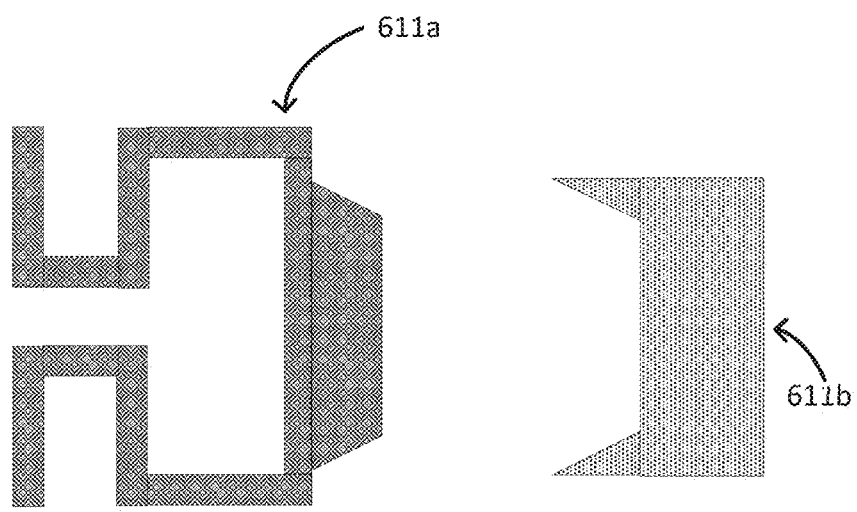

FIGS. 8C and 8D are respective cross-sections of FIGS. 8A and 8B. In one embodiment, both of cup 611b and cone 611a can be formed of titanium with, for example, a rod used to tension the connectors in the stowed configuration. When released, the cup 611b and cone 611a can act as a passive spring mechanism to deploy the satellites.

FIG. 9 presents a top view of an alternate embodiment to illustrate a launch configuration for three satellites. In the stowed configuration, the three satellites 901a, 901b, and 901c are again connected at each of the lower, inner corners by a connector to the ring of a launch vehicle interface 921 and fit within the outline of the fairing 923, where the diameter of each of ring of a launch vehicle interface and the fairing can be the same as in FIGS. 7A-7D or of other sizes. The cylindrical region in the center of the configuration is now triangular. As can be seen by comparing FIG. 9 to FIG. 7B, having fewer satellites allows for larger satellites. It should be noted that although the three satellites of FIG. 9 are of the same size in horizontal cross-section (i.e., as viewed from the top), as are the five satellites of FIGS. 7A-7D, other embodiments can use a launch configuration of satellites of differing sizes, where these would still be such that they can attach to the launch vehicle interface and to their neighbor on either side when in the bundle of the launch configuration.

Figure 10:
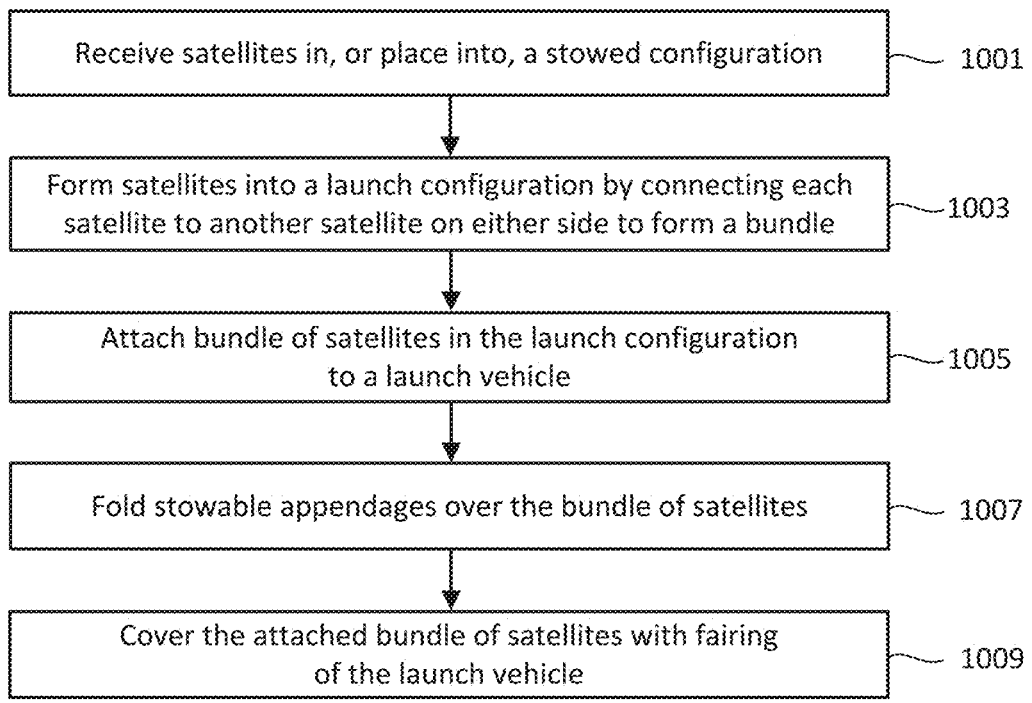
FIGS. 10 and 11 are flowcharts respectively describing embodiments for placing the satellites into a launch configuration and the deploying of the satellites.
Figure 11:
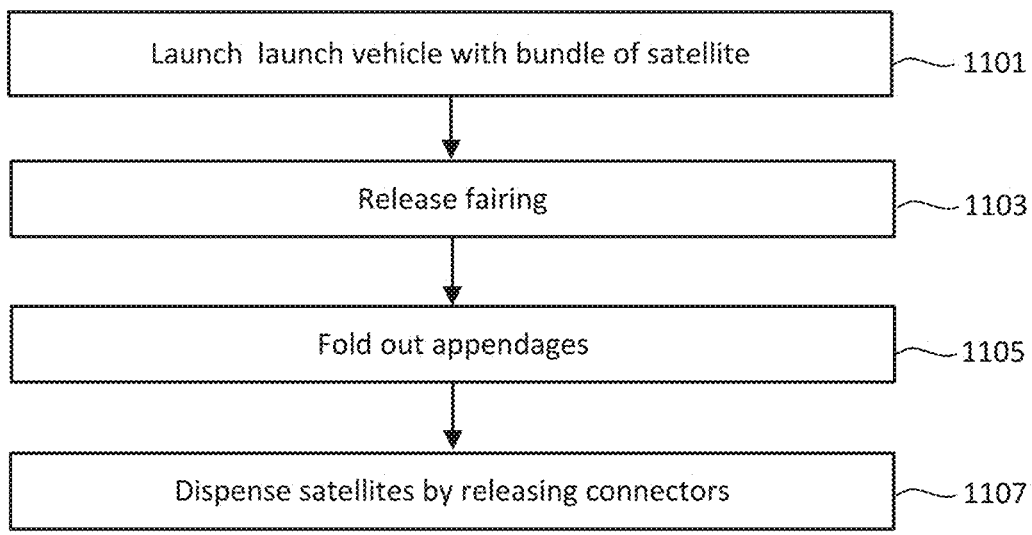

FIGS. 10 and 11 are flowcharts respectively describing embodiments for placing the satellites into a launch configuration and the deploying of the satellites. At step 1001, the satellites (e.g., 601a, 601b, 601c, 601d, 601e or 901a, 901b, 901c) are received, where this can include manufacturing or assembling of the components of the satellites. If the satellites are not in their stowed configuration, the are placed into the stowed configuration as part of step 1001. At step 1003 the satellites are formed into the launch configuration by connecting the satellites to each other in a bundle, or composite beam structure, using the connectors 611 along the vertical edges of their inward facing sides. The bundle of satellites in the launch configuration is attached launch vehicle at its launch vehicle interface 621/921 at step 1005. Depending on the embodiment, the set of satellites can be formed into the bundle (step 1003) prior to attachment to the launch vehicle (step 1005), or one or more of the satellites can be attached to the launch vehicle's interface before assembling the bundle. In embodiments including one or more of the stowable appendages 1201a, 1201b, 1201c, 1201d, 1201e, at step 1007 these are folded down and stowed over the top of the bundle. Once the satellites are in their launch configuration and attached to the launch vehicle, the launch vehicle fairing (outline at 623/923) can be put in place to cover them and the launch vehicle made ready for launch.

FIG. 11 begins at step 1101 by launching of the launch vehicle, including the satellites (e.g., 601a, 601b, 601c, 601d, 601e or 901a, 901b, 901c) in their launch configuration. Once the launch vehicle is at the appropriate location for the satellites, they can be deployed beginning by removing the fairing (outline at 623/923) covering the composite beam launch configuration at step 1103. If the satellites include stowed appendages 1231a, 1231b, 1231c, 1231d, or 1231e as illustrated in FIGS. 12A-12C, these can be at least partially folded out at step 1105 to allow the satellites to be dispensed at step 1107 by releasing the connectors 611.

As noted above, the dispenserless multi-satellite launch configurations discussed above with respect to FIGS. 7A-7D and 9 provide both a central N-sided polygon cylindrical region and a region above the multi-satellite bundle that can be used to stow deployable satellite appendages, such as reflectors, solar arrays, or antennae. FIGS. 12A-12C illustrate embodiments of such launch configured bundles of satellites for the N=5 embodiment of FIGS. 7A-7D.

Figure 12B:
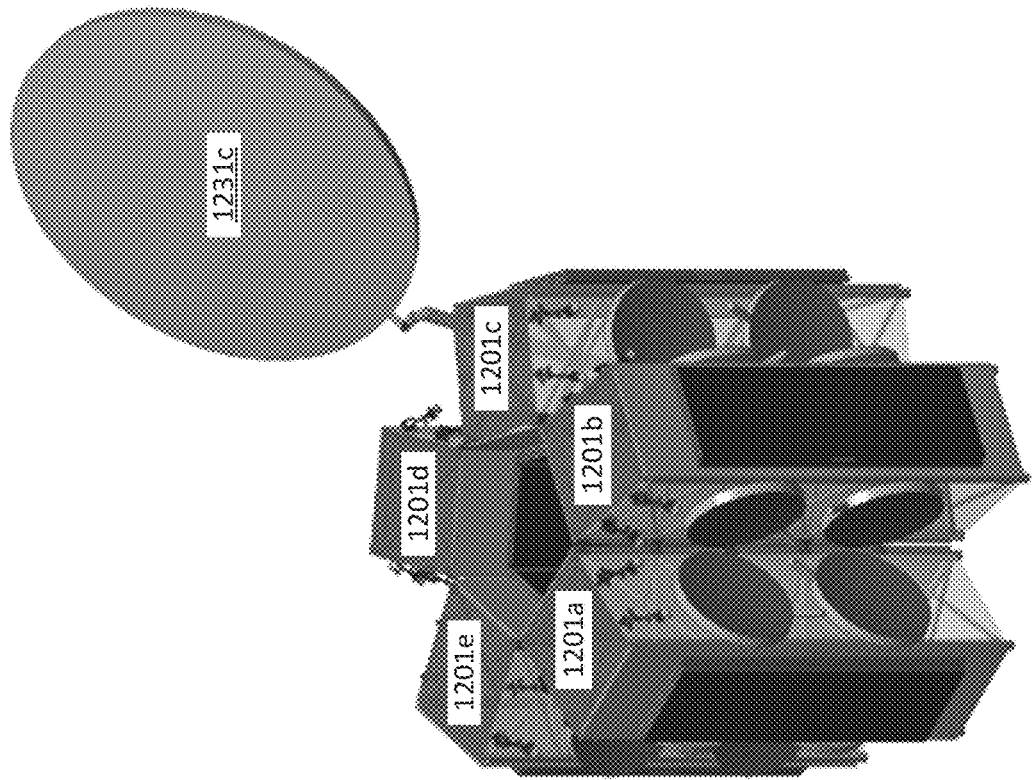
FIGS. 12A-12C illustrate the use of the area above a launch configured multi-satellite bundle for the stowage of satellite components.
Figure 12A:
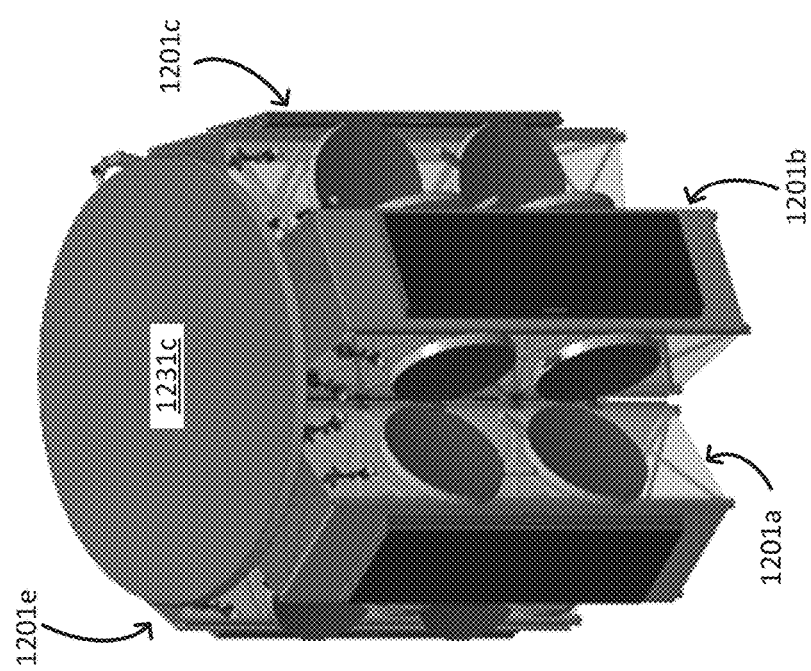
Figure 12C:
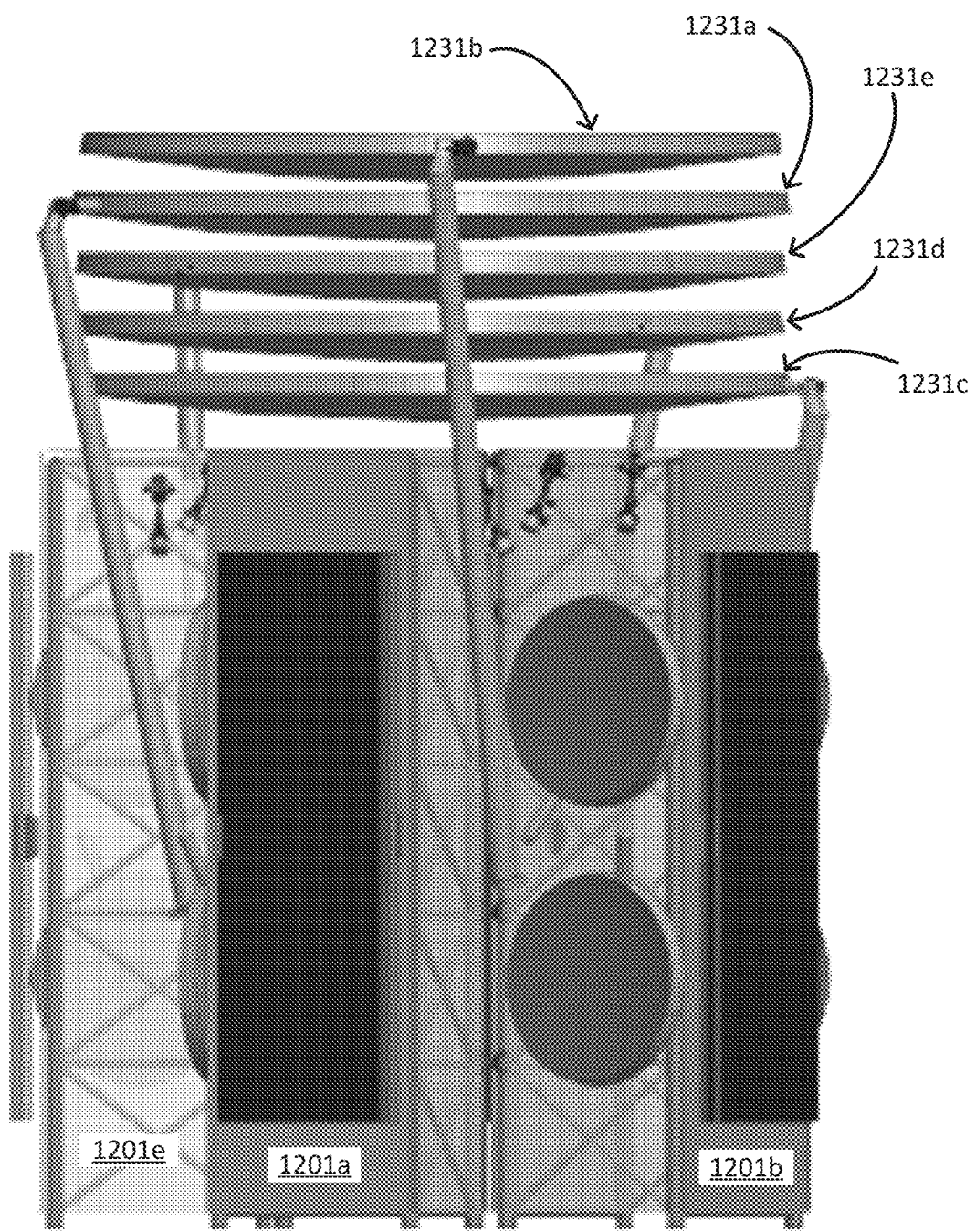

FIGS. 12A-12C illustrate the use of the area above a launch configured multi-satellite bundle for the stowage of satellite components. A bundle of five satellites 1201a, 1201b, 1201c, 1201d, and 1201e are in a launch configuration as described above with respect to FIGS. 7A-7D. Usually, when in a stowed configuration, the deployable appendages of a spacecraft fit within the form factor of the spacecraft, such as is illustrated for the solar arrays 607 and reflectors or antenna 609 in FIGS. 6A-6D. FIGS. 12A and 12B illustrate the multi-satellite bundle with one of the satellites 1201c additionally having a larger deployable appendage 1231c, such as a reflector in this example, that does not fit within form factor of the individual satellite 1201c when stowed, but does fit with the form factor of the cross-section above the multi-satellite bundle in its launch configuration. More specifically, FIG. 12A shows the reflector 1201c in the stowed configuration and FIG. 12B shows the bundle in an early stage of deployment where the reflector 1201c has been deployed or partially deployed, but prior to the satellites themselves deploying. In one set of embodiments for stowing the structure into the launch configuration, the satellites 1201a, 1201b, 1201c, 1201d, and 1201e would be formed into the bundle, after which the reflector 1201c is folded into the stowed configuration above the bundle. To deploy the bundle after launch, the reflector 1201c would be deployed or partially deployed as shown in FIG. 12B, after which the individual satellites can be deployed as described above with respect to FIG. 11.

FIG. 12C is side view of a bundle of five satellites 1201a, 1201b, 1201c, 1201d, and 1201e in a launch configuration similar to the oblique view of FIG. 12A, but where each of the satellites 1201a, 1201b, 1201c, 1201d, and 1201e has a corresponding large deployable appendage 1231a, 1231b, 1231c, 1231d, and 1231e, such as a reflector, folded down over the bundle when in launch configuration. For stowing, the satellites can be placed into launch configuration as described with respect to FIG. 10, with the large deployable appendage folded down starting with the bottom-most (1231c) and working up to the top-most (1231b). To deploy, the appendages are partially or completed deployed in reverse order, after which the satellites can be deployed as described with respect to FIGS. 11.

A first embodiment includes a plurality of N satellites each having a stowed configuration and a deployed configuration, the plurality of satellites configured to connect together into a launch configuration. Each of the satellites includes: one or more first connectors configured to connect to an interface of a launch vehicle, the one or more first connectors on a bottom side of the satellite when in the launch configuration; and one or more pairs of second connectors on vertical sides of the satellite, a first of each of the pair second connectors configured to connect to another of the satellites to a first side of the satellite when in the launch configuration and a second of each of pair of second connectors configured to connect to another of the satellites to a second side of the satellite when in the launch configuration. The plurality of satellites, when in the stowed configuration, are configured to connect to each other by the second connectors to form the launch configuration as a composite beam structure independent of the launch vehicle that is configured to connect to the launch vehicle interface by the first connectors.

One embodiment includes a method, the method including: receiving a plurality of N satellites and forming the satellites into a launch configuration where forming the satellites into a launch configuration includes: connecting each of the satellites to a first other one of the satellites along one side and to a second other one of the satellites along another side to form a bundle of the satellites. The method further includes attaching the bundle of the satellites in the launch configuration to a launch vehicle by attaching each of the satellites by one or more connectors on the bottom thereof, but not connecting the satellites along the sides thereof.

One embodiment includes a satellite having a frame structure with a first rectangular side. The satellite also includes: one or more interface connectors located along a lower edge of the first rectangular side and configured to connect to an interface of a launch vehicle; one or more first connectors located on a first vertical edge of the first rectangular side and configured to connect to a first of a plurality of additional satellites; and one or more second connectors located on a second vertical edge of the first rectangular side and configured to connect to a second of the plurality of additional satellites. The one or more first connectors and the one or more second connectors are configured connect the satellite and the plurality of additional satellites to form a launch configuration as a composite beam structure independent of the launch vehicle that is configured to connect to the interface of the launch vehicle by the one or more interface connectors.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A system, comprising:
a plurality of N satellites, each having a stowed configuration and a deployed configuration, the plurality of satellites configured to connect together into a launch configuration, each of the satellites comprising:
one or more first connectors configured to connect to an interface of a launch vehicle, the one or more first connectors on a bottom side of the satellite when in the launch configuration; and
one or more pairs of second connectors on vertical sides of the satellite, a first of each of the pair of second connectors configured to connect to another of the satellites to a first side of the satellite when in the launch configuration and a second of each of the pair of second connectors configured to connect to another of the satellites to a second side of the satellite when in the launch configuration, and
a first plurality of the satellites each further comprising a corresponding stowable appendage,
the plurality of satellites, when in the stowed configuration, configured to connect to each other by the second connectors to form the launch configuration as a composite bundle structure independent of the launch vehicle that is configured to connect to the launch vehicle interface by the first connectors, and
when, in the launch configuration, the corresponding stowable appendages of each of the first plurality of the satellites are stowed one above another above all of the plurality of satellites of the composite bundle structure.

2. The system of claim 1, further comprising:
the launch vehicle, comprising:
an interface configured to connect to the first connectors of the plurality of satellites in the launch configuration.

3. The system of claim 2, wherein the interface is a ring structure configured to connect to the first connectors of the plurality of satellites in the launch configuration.

4. The system of claim 3, wherein the launch vehicle further comprises:
a fairing covering the plurality of satellites in the launch configuration.

5. The system of claim 1, wherein each of the satellites comprise a truss-type frame structure.

6. The system of claim 1, wherein:
each of the satellites includes a first rectangular side, wherein, when the satellites are in the launch configuration, the first rectangular sides are inward facing vertical sides, and
for each of the satellites:
the one or more first connectors are located along a lower edge of the first rectangular side, and
a first of each of the one or more pairs of second connectors are located on a first vertical edge of the first rectangular side and a second of each of the one or more pairs of second connectors are located on a second vertical edge of the first rectangular side.

7. The system of claim 1, wherein the corresponding stowable appendage of the first of the satellites is a reflector.

8. A method, comprising:
receiving a plurality of N satellites, a first plurality of the plurality of satellites each including a stowable appendage;
forming the satellites into a launch configuration, including:
connecting each of the satellites to a first other one of the satellites along one side and to a second other one of the satellites along another side to form a bundle of the satellites; and
subsequent to forming the bundle of the satellites, stowing the stowable appendages of each of the first plurality of the satellites one above another above all of the plurality of satellites of the bundle of the satellites; and
attaching the bundle of the satellites in the launch configuration to a launch vehicle by attaching each of the satellites by one or more connectors on the bottom thereof, but not connecting the satellites along the sides thereof to the launch vehicle.

9. The method of claim 8, wherein the satellites are formed into the bundle prior to connecting the bundle to the launch vehicle.

10. The method of claim 8, wherein one or more of the satellites are attached to the launch vehicle prior to forming the satellites into the bundle.

11. The method of claim 8, further comprising:
subsequent to attaching the bundle of the satellites in the launch configuration to a launch vehicle, covering the bundle with a fairing of the launch vehicle.

12. The method of claim 8, wherein
connecting each of the satellites to the first other one of the satellites along the one side includes attaching one or more connectors along the one side; and
connecting each of the satellites to the second other one of the satellites along the another side includes attaching one or more connectors along the another side.

13. The method of claim 8, wherein receiving the plurality of satellites includes putting each of the satellites into a stowed configuration prior to forming the satellites into a launch configuration.

14. A satellite, comprising:
a frame structure having a first rectangular side;
one or more interface connectors located along a lower edge of the first rectangular side and configured to connect to an interface of a launch vehicle;
one or more first connectors located on a first vertical edge of the first rectangular side and configured to connect to a first of a plurality of additional satellites;
one or more second connectors located on a second vertical edge of the first rectangular side and configured to connect to a second of the plurality of additional satellites, the one or more first connectors and the one or more second connectors configured to connect the satellite and the plurality of additional satellites to form a launch configuration as a composite bundle that is configured to connect to the interface of the launch vehicle by the one or more interface connectors; and
a stowable appendage, wherein, when in the launch configuration, the stowable appendage is stowed above the bundle, including being stowed above the satellite and above each of the additional satellites of the composite bundle and above a stowable appendage of each of one or more of the additional satellites.

15. The system of claim 1, wherein each of the second connectors comprises one of either a cup or a cone configured to connect the other of the cup or the cone as a cup and cone pair when in the launch configuration, the cup and cone pair configured as a passive spring mechanism that, when released from the launch configuration, is configured to deploy the satellites.

16. The system of claim 1, wherein each of the satellites further comprises:
 a pair of solar arrays each mounted on a corresponding one of a first pair of opposing sides of the satellite and configured to fold into a deployable stowed configuration; and
 one or both of a reflector and an antenna mounted on each of one of a second pair of opposing sides of the satellite and configured to fold into a deployable stowed configuration.

17. The method of claim 8, wherein an additional one or more of the plurality of satellites further comprise a corresponding stowable appendage and forming the satellites into the launch configuration further includes:
 stowing the corresponding stowable appendages of the first of the satellites and the corresponding stowable appendages of the additional one or more satellites one above another above the plurality of the bundle of satellites.

18. The method of claim 12, wherein each of the connectors along the one side comprise a cup and each of the connectors along the other side comprise a cone, and wherein:
 connecting each of the satellites to the first other one of the satellites along the one side includes attaching the cups along the one side to cones of the first other one of the satellites; and
 connecting each of the satellites to the second other one of the satellites along the another side includes attaching cones along the another side to cups of the second other one of the satellites, wherein, when attached as cup and cone pairs configured as a passive spring mechanism that, when released from the launch configuration, is configured to deploy the satellites, the method further comprising:
subsequent to attaching the bundle of the satellites in the launch configuration to the launch vehicle, launching the launch vehicle; and
subsequent to launching the launch vehicle, dispensing the plurality of satellites by releasing the cup and cone pairs.

19. The satellite of claim 14, wherein:
the first connectors comprise cups configured to connect to cones of the first of the additional satellites to form first cup and cone pairs; and
the second connectors comprise cones configured to connect to cups of the second of the additional satellites to form second cup and cone pairs, each of the cup and cone pairs configured as a passive spring mechanism that, when released, is configured to deploy the satellite.

* * * * *